US011146705B2

(12) United States Patent
Saitoh

(10) Patent No.: US 11,146,705 B2
(45) Date of Patent: Oct. 12, 2021

(54) CHARACTER RECOGNITION DEVICE, METHOD OF GENERATING DOCUMENT FILE, AND STORAGE MEDIUM

(71) Applicant: Takayuki Saitoh, Kanagawa (JP)

(72) Inventor: Takayuki Saitoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/901,441

(22) Filed: Jun. 15, 2020

(65) Prior Publication Data

US 2020/0396351 A1 Dec. 17, 2020

(30) Foreign Application Priority Data

Jun. 17, 2019 (JP) ............................. JP2019-112238

(51) Int. Cl.
*H04N 1/00* (2006.01)
*G06K 9/00* (2006.01)

(52) U.S. Cl.
CPC ..... *H04N 1/00824* (2013.01); *G06K 9/00449* (2013.01); *H04N 1/00806* (2013.01); *G06K 2209/01* (2013.01)

(58) Field of Classification Search
None
See application file for complete search history.

(56) References Cited

U.S. PATENT DOCUMENTS 4,813,078 A * 3/1989 Fujiwara .................. G06K 9/50 382/185
5,646,840 A * 7/1997 Yamauchi ............... G06F 40/55 704/2
5,682,439 A * 10/1997 Beernink ............ G06F 3/04883 382/187
5,781,660 A * 7/1998 Nitta .................... G06K 9/3283 382/173
5,841,902 A * 11/1998 Tu ............................ G06K 9/46 382/187

(Continued)

FOREIGN PATENT DOCUMENTS

JP 2010-211470 9/2010
WO WO2015/159941 A1 10/2015

*Primary Examiner* — Anh-Vinh T Nguyen
(74) *Attorney, Agent, or Firm* — Harness, Dickey & Pierce, P.L.C.

(57) ABSTRACT

A character recognition device is configured to convert characters on a scanned image obtained by reading a document into digital data. The character recognition device includes control circuitry. The control circuitry is configured to perform character recognition processing on the scanned image; generate data in which candidate characters or character strings of a character or character string recognized by the character recognition processing are associated with recognition degrees representing probabilities of the candidate characters or character strings; display a first candidate having a highest recognition degree among the candidate characters or character strings; and generate a document file in a format in which another candidate, other than the first candidate, of the candidate characters or character strings is displayed simultaneously with the first candidate, in association with the first candidate, and in a form different from a form of the first candidate.

17 Claims, 9 Drawing Sheets

(56) References Cited

U.S. PATENT DOCUMENTS 6,141,443 A * 10/2000 Nakao ................ G06K 9/00463 382/174
6,438,265 B1 * 8/2002 Heilper .................... G06K 9/38 382/172
6,577,762 B1 * 6/2003 Seeger ..................... G06K 9/38 382/173
6,690,824 B1 * 2/2004 Stringa ................ G06K 9/6255 382/176
8,139,257 B2 * 3/2012 Fabrice ................... G06T 11/60 358/1.18
8,201,072 B2 * 6/2012 Matulic .............. G06K 9/00456 715/200
8,508,795 B2 * 8/2013 Ohguro ................. G06F 40/103 358/1.9
8,965,117 B1 * 2/2015 Rybakov .............. G06K 9/6267 382/165
9,990,347 B2 * 6/2018 Raskovic .............. G06F 40/177
2002/0006220 A1 * 1/2002 Kohchi .............. G06K 9/00456 382/165
2002/0085758 A1 * 7/2002 Ayshi ................... G06K 9/4604 382/199
2003/0123732 A1 * 7/2003 Miyazaki ........... G06K 9/00449 382/186
2004/0017944 A1 * 1/2004 Ding .................... G06K 9/4609 382/182
2004/0240737 A1 * 12/2004 Lim ....................... G06K 9/325 382/182
2005/0201620 A1 * 9/2005 Kanamoto ........... G06K 9/2018 382/182
2007/0150500 A1 * 6/2007 Kawada ................. G06Q 10/10
2009/0177653 A1 * 7/2009 Hirabayashi ....... G06K 9/00469
2010/0061633 A1 * 3/2010 Ma ........................... G06K 9/40 382/176
2010/0192178 A1 * 7/2010 Candelore ............. H04N 21/44 725/39
2011/0258195 A1 * 10/2011 Welling ................... G06K 9/72 707/740
2012/0038659 A1 * 2/2012 Matsuguma ........... G06K 9/346 345/589
2012/0087537 A1 * 4/2012 Liu .................... G06K 9/00469 382/100
2012/0088543 A1 * 4/2012 Lindner .................. G10L 13/00 455/556.1
2012/0120444 A1 * 5/2012 Hirohata .................. G06K 9/42 358/1.15
2014/0009772 A1 * 1/2014 Gao ......................... G06K 9/38 358/1.11
2014/0032267 A1 * 1/2014 Smith ................ G06Q 30/0201 705/7.29
2014/0078559 A1 * 3/2014 Wu .................... G06K 9/00979 358/452
2014/0080511 A1 3/2014 Saitoh
2014/0118796 A1 * 5/2014 Isaev .................. H04N 1/00018 358/451
2014/0366052 A1 * 12/2014 Ives ................. H04N 21/23418 725/19
2015/0070714 A1 3/2015 Sadasue et al.
2015/0071493 A1 3/2015 Kajiwara et al.
2015/0131908 A1 * 5/2015 Mei .......................... G06K 9/46 382/182
2015/0169995 A1 * 6/2015 Panferov ............ G06K 9/00463 382/182
2015/0278162 A1 * 10/2015 Korneev ............... G06F 40/237 707/690
2016/0012288 A1 * 1/2016 Goto .................. G06K 9/00463 382/137
2016/0259971 A1 * 9/2016 Kim ....................... H04N 1/387
2017/0161495 A1 * 6/2017 Viswanath ............ G06F 21/554
2018/0077309 A1 3/2018 Saitoh
2018/0096150 A1 * 4/2018 Viswanath ............ G06F 21/566
2018/0101726 A1 * 4/2018 Wang ................. G06K 9/00463
2018/0114085 A1 * 4/2018 Gopalakrishnan ........................... G06K 9/00463
2018/0253599 A1 * 9/2018 Shepard ............. G06K 9/00469
2019/0095709 A1 * 3/2019 Hara ........................ H04N 1/40
2019/0114743 A1 * 4/2019 Lund .................... G06N 3/0454
2020/0026970 A1 * 1/2020 Berseth ................ G06K 9/6828
2020/0234003 A1 * 7/2020 Bakman .................. H04W 4/50
2020/0320288 A1 * 10/2020 Kunnumma ....... G06K 9/00449
2021/0081661 A1 * 3/2021 Dabholkar ............ G06F 40/232

* cited by examiner

SCANNED IMAGE

CHARACTER INFORMATION + SUPPLEMENTARY INFORMATION

CHARACTER-DELETED IMAGE

DOCUMENT FILE

CHARACTER RECOGNITION DEVICE, METHOD OF GENERATING DOCUMENT FILE, AND STORAGE MEDIUM

CROSS-REFERENCE TO RELATED APPLICATION

This patent application is based on and claims priority pursuant to 35 U.S.C. § 119(a) to Japanese Patent Application No. 2019-112238, filed on Jun. 17, 2019, in the Japan Patent Office, the entire disclosure of which is incorporated by reference herein.

BACKGROUND

Technical Field

Embodiments of the present disclosure relate to a character recognition device, a method of generating a document file, and a storage medium.

Related Art

It is a common practice to read a document on which characters and images are written with a scanner and extract text data using an optical character recognition/reader (OCR) technique.

As a related technique, in order to improve search accuracy, when a plurality of recognition candidates are obtained in character recognition, data to be a candidate is transparently generated at a position of a corresponding predetermined delimiter unit of image data or in the vicinity thereof.

SUMMARY

In an aspect of the present disclosure, there is provided a character recognition device configured to convert characters on a scanned image obtained by reading a document into digital data. The character recognition device includes control circuitry. The control circuitry is configured to perform character recognition processing on the scanned image; generate data in which candidate characters or character strings of a character or character string recognized by the character recognition processing are associated with recognition degrees representing probabilities of the candidate characters or character strings; display a first candidate having a highest recognition degree among the candidate characters or character strings; and generate a document file in a format in which another candidate, other than the first candidate, of the candidate characters or character strings is displayed simultaneously with the first candidate, in association with the first candidate, and in a form different from a form of the first candidate.

In another aspect of the present disclosure, there is provided a method for generating a document file in a character recognition device configured to convert characters on a scanned image obtained by reading a document into digital data. The method includes performing character recognition processing on the scanned image; generating data in which candidate characters or character strings of a character or character string recognized by the character recognition processing are associated with recognition degrees representing probabilities of the candidate characters or character strings; displaying a first candidate having a highest recognition degree among the candidate characters or character strings; and generating a document file in a format in which another candidate, other than the first candidate, of the candidate characters or character strings is displayed simultaneously with the first candidate, in association with the first candidate, and in a form different from a form of the first candidate.

In still another aspect of the present disclosure, there is provided a non-transitory computer-readable storage medium storing program code for causing a computer to execute: performing character recognition processing on a scanned image; generating data in which candidate characters or character strings of a character or character string recognized by the character recognition processing are associated with recognition degrees representing probabilities of the candidate characters or character strings; displaying a first candidate having a highest recognition degree among the candidate characters or character strings; and generating a document file in a format in which another candidate, other than the first candidate, of the candidate characters or character strings is displayed simultaneously with the first candidate, in association with the first candidate, and in a form different from a form of the first candidate.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
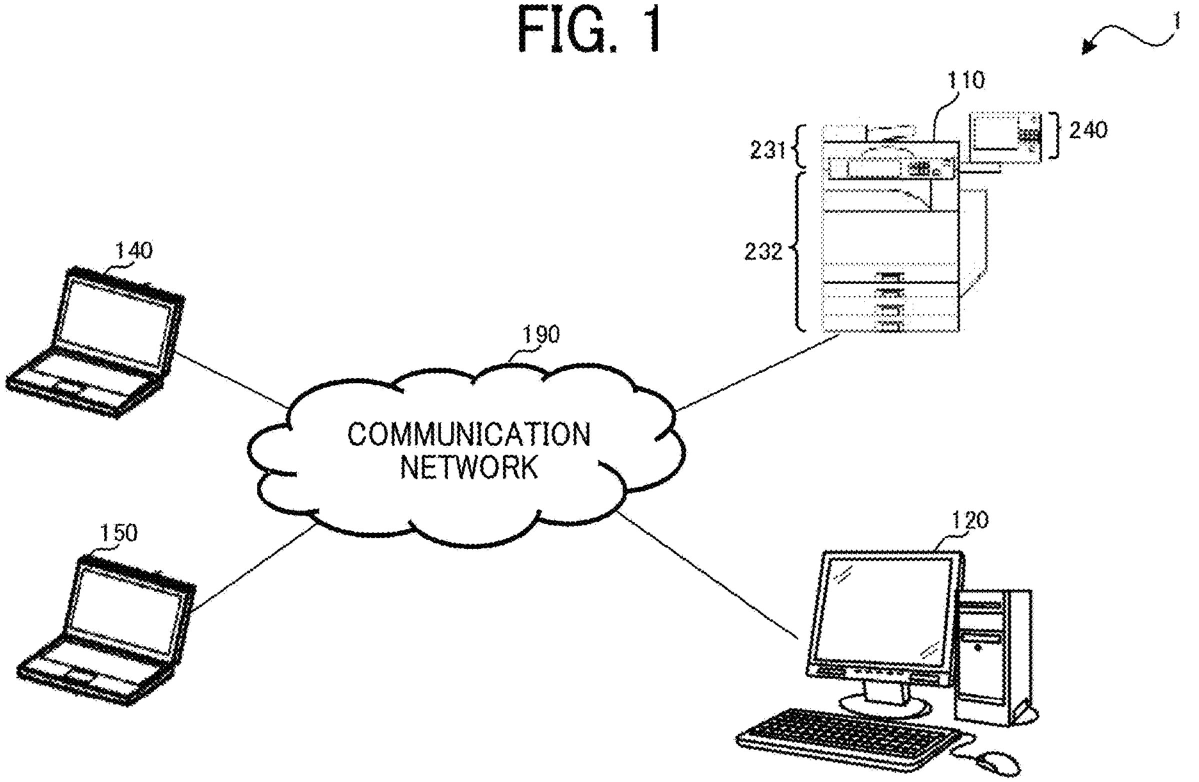
FIG. 1 is a diagram illustrating an example of a system configuration according to an embodiment.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results. As used herein, the singular forms "a", "an", and "the" are intended to include the plural forms as well, unless the context clearly indicates otherwise.

Although the embodiments are described with technical limitations with reference to the attached drawings, such description is not intended to limit the scope of the disclosure and all of the components or elements described in the embodiments of this disclosure are not necessarily indispensable.

Hereinafter, a character recognition device, a method of generating a document file, and a program of generating a document file according to embodiments of the present disclosure are described with reference to the drawings.

System Configuration FIG. 1 is a diagram illustrating a system configuration of an embodiment of the present disclosure. A system 1 according to the present embodiment includes an image forming apparatus 110, a file server 120, and two personal computers (PCs) 140 and 150, which transmit and receive data to and from each other via a communication network 190.

The image forming apparatus 110 is a multifunction peripheral (MFP) including, e.g., a scanner 231 to read a document sheet, a printer 232 to form an image on a sheet, and a communication function. When an automatic document feeder (ADF) is provided, the scanner 231 reads the document sheet set on the ADF. The image forming apparatus 110 uses the scanner 231 and the printer 232 to provide a user with functions of copying, printing, scanning, and facsimile. The image forming apparatus 110 receives an instruction from a user via an operation panel 240 or receives an instruction from the PC 140 or the PC 150 via the communication network 190 to execute such functions.

The image forming apparatus 110 also has a function of extracting a text of electronic data from a scanned image read by the scanner 231 using a technique of optical character recognition (hereinafter, simply referred to as "character recognition" or "OCR" as necessary).

The PCs 140 and 150 are terminals (computers) used by general users who use the image forming apparatus 110.

The file server 120 is a server (computer) that stores image data read by the reading function of the image forming apparatus 110. In the file server 120, a dedicated folder is provided for each user, and files are stored in the dedicated folder to hold various data. The file server 120 stores text data extracted by the OCR function of the image forming apparatus 110 and a document file obtained by an operation described below.

Hardware Configurations of Apparatuses

Figure 2:
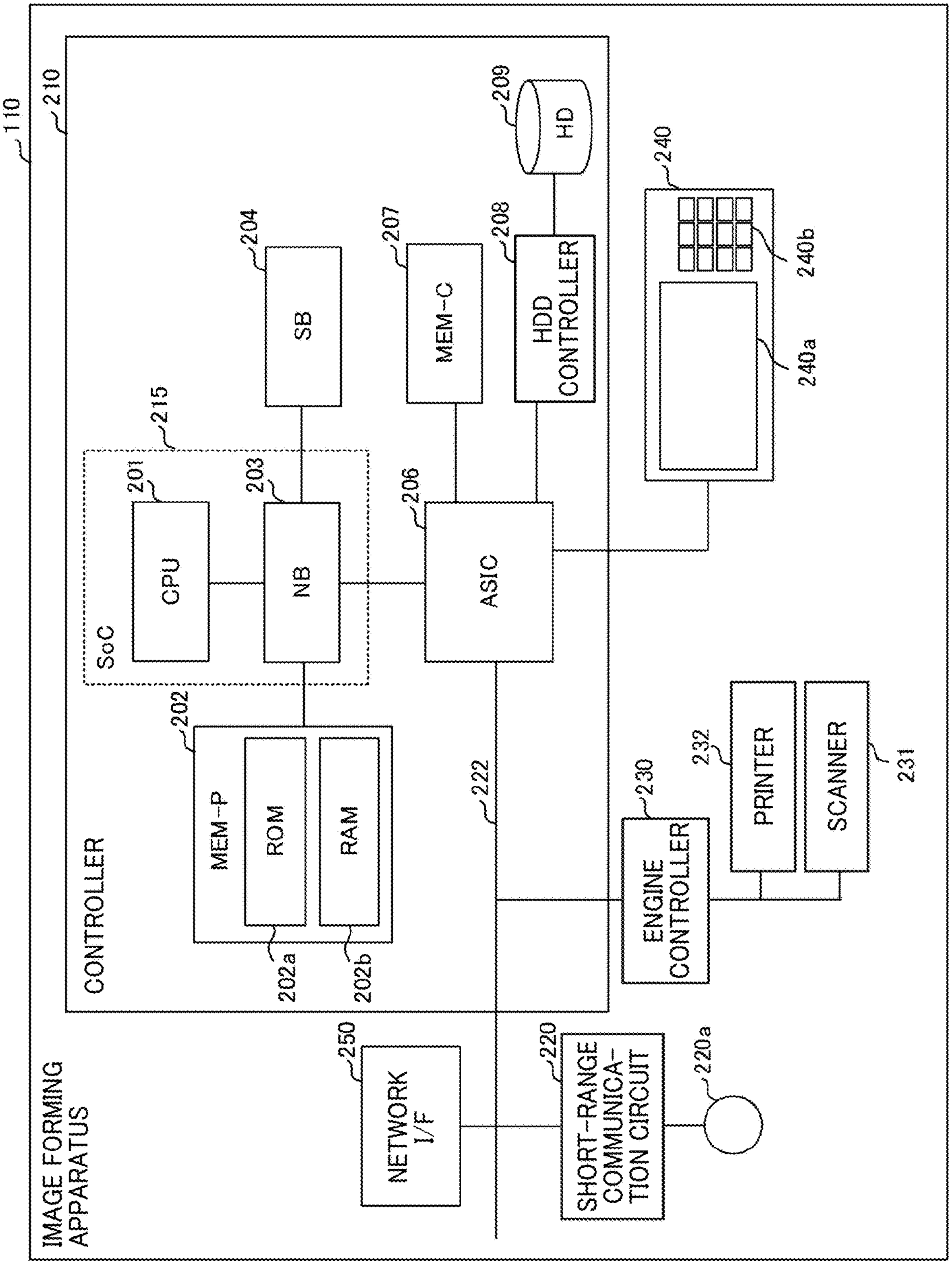
FIG. 2 is a block diagram illustrating an example of an internal configuration of an image forming apparatus according to an embodiment.

FIG. 2 is a diagram illustrating an example of a hardware configuration of the image forming apparatus 110. As illustrated in FIG. 2, the image forming apparatus 110 includes a controller 210, a short-range communication circuit 220, an engine controller 230, an operation panel 240, and a network interface (L/F) 250.

The controller 210 includes a central processing unit (CPU) 201 as a main unit of a computer, a system memory (MEM-P) 202, a north bridge (NB) 203, a south bridge (SB) 204, an application specific integrated circuit (ASIC) 206, a local memory (MEM-C) 207 as a storage device, a hard disk drive (HDD) controller 208, and a hard disk (HD) 209 as a storage device. The NB 203 and the CPU 201 are integrated by a system on a chip (SoC) 215.

The CPU 201 is a control unit that performs overall control of the image forming apparatus 110. The NB 203 is a bridge for connecting the CPU 201, the MEM-P202, and the SB 204, and includes a memory controller that controls reading and writing from and to the MEM-P202, a peripheral component interconnect (PCI) master, and an accelerated graphics port (AGP) target.

The MEM-P202 includes a read only memory (ROM) 202a, which is a memory to store programs and data for realizing the functions of the controller 210 and a random access memory (RAM) 202b, which is used as a memory for developing programs and data and drawing in memory printing. The program stored in the RAM 202b may be provided as a file in an installable format or an executable format in a state in which the program is recorded in a computer-readable storage medium such as a compact disc-read only memory (CD-ROM), a compact disc-recordable (CD-R), or a digital versatile disc (DVD).

The SB 204 is a bridge to connect the NB 203 to a PCI device and a peripheral device. The ASIC 206 is an integrated circuit (IC) for image processing having a hardware element for image processing and has a role of a bridge that connects a PCI bus 222, the HDD controller 208, and the MEM-C 207 to each other. The ASIC 206 includes a PCI target, an AGP master, an arbiter (ARB) serving as a core of the ASIC 206, a memory controller that controls the MEM-C 207, a plurality of direct memory access controllers (DMACs) that rotates image data by hardware logic, and a PCI unit that transfers data between the scanner 231 and the printer 232 via the PCI bus 222. A universal serial bus (USB) interface or an Institute of Electrical and Electronics Engineers 1394 (IEEE 1394) interface may be connected to the ASIC 206.

The MEM-C 207 is a local memory used as a copy image buffer and a code buffer. The HD 209 is a storage in which a program for executing an operation described later and data for various controls are stored in advance, and is also used to accumulate image data and font data and forms used in printing. The HD 209 controls reading or writing of data from or to the HD 209 under the control of the CPU 201.

The short-range communication circuit 220 includes a communication circuit 220a for, e.g., near-field communication (NFC) or Bluetooth (registered trademark) and realizes data communication with an IC card possessed by the user. When the user holds the IC card near the communication circuit 220a, the short-range communication circuit 220 reads various data recorded in the IC card.

The engine controller 230 controls the scanner 231 and the printer 232. The operation panel 240 includes a panel display 240a and an operation panel 240b. The panel display 240a is, e.g., a touch panel that displays current settings or a selection screen and that receives a user input. The operation panel 240b is constructed of, e.g., a numeric keypad and a start key. The numeric keypad receives assigned values of image forming parameters such as an image density parameter. The start key receives an instruction to start copying. The controller 210 controls the entire image forming apparatus 110 and controls, for example, drawing, communication, and input from the operation panel 240. The scanner 231 or the printer 232 includes an image processing unit such as error diffusion or gamma conversion.

Note that, in response to an instruction to select a specific application through the operation panel 240 by use of, e.g., an application (or mode) switch key, the image forming apparatus 110 selectively performs a document box function (scanner function), a copier function, a printer function, and a facsimile function. The document box function (scanner function) also has a function of extracting text from an image by OCR and converting the text into a format usable by various office applications.

The network I/F 250 is an interface to perform data communication using the communication network 190. The short-range communication circuit 220 and the network I/F 250 are electrically connected to the ASIC 206 via the PCI bus 222.

Figure 3:
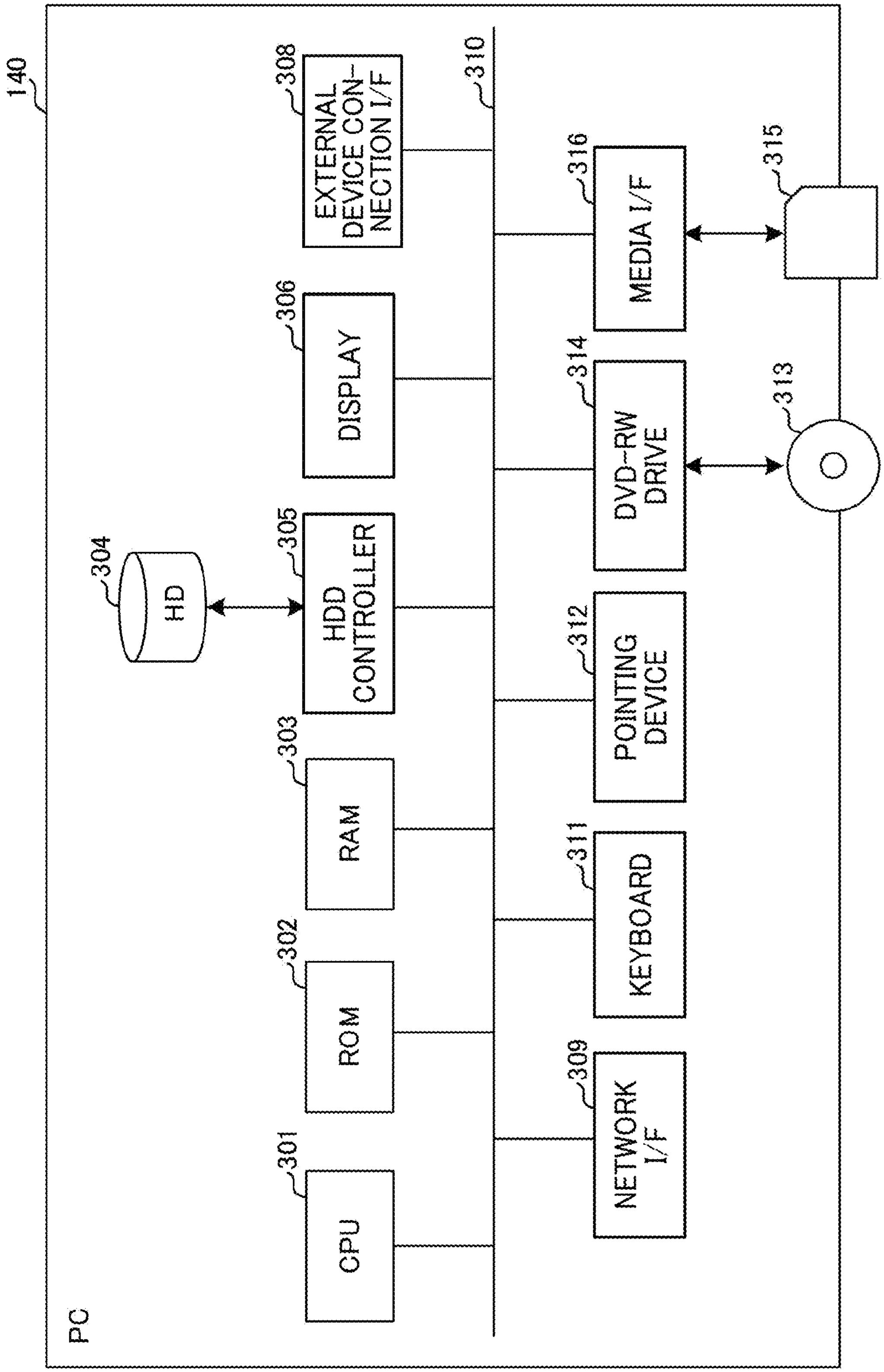
FIG. 3 is a block diagram illustrating an example of an internal configuration of a personal computer according to an embodiment.

FIG. 3 illustrates a hardware configuration of the PC 140. Although FIG. 3 illustrates the PC 140 as an example, computers such as the PC 150 and the file server 120 have similar, even if not the same, configurations.

The PC 140 is implemented by a computer and includes a CPU 301, a ROM 302, a RAM 303, an HD 304, an HDD controller 305, a display 306, an external device connection I/F 308, a network I/F 309, a data bus 310, a keyboard 311, a pointing device 312, a digital versatile disc rewritable (DVD-RW) drive 314, and a media I/F 316.

The CPU 301 controls the overall operation of the PC 140. The ROM 302 stores programs used for driving the CPU 301, such as an IPL. The RAM 303 is used as a work area of the CPU 301. The HD 304 stores various data such as programs. The HDD controller 305 controls reading or writing of various data from or to the HD 304 under the control of the CPU 301. The display 306 displays various types of information such as a cursor, a menu, a window, characters, or an image. The external device connection I/F 308 is an interface for connecting various external devices. In this case, the external device is, for example, a USB memory, a printer, or the like. The network I/F 309 is an interface for performing data communication using the communication network 190. The data bus 310 is an address bus, a data bus, or the like that electrically connect components such as the CPU 301 illustrated in FIG. 3.

The keyboard 311 is a kind of input unit including a plurality of keys to input characters, numerical values, various instructions, and the like. The pointing device 312 is a kind of input unit to select and execute various instructions, select a processing target, move a cursor, and the like. The DVD-RW drive 314 controls reading or writing of various data from or to a DVD-RW 313 as an example of a removable storage medium. The storage medium is not limited to the DVD-RW, and may be other media such as a digital versatile disc-recordable (DVD-R). The media I/F 316 controls reading or writing (storing) of data from or to a recording medium 315 such as a flash memory.

Configuration of Embodiment

Figure 4:
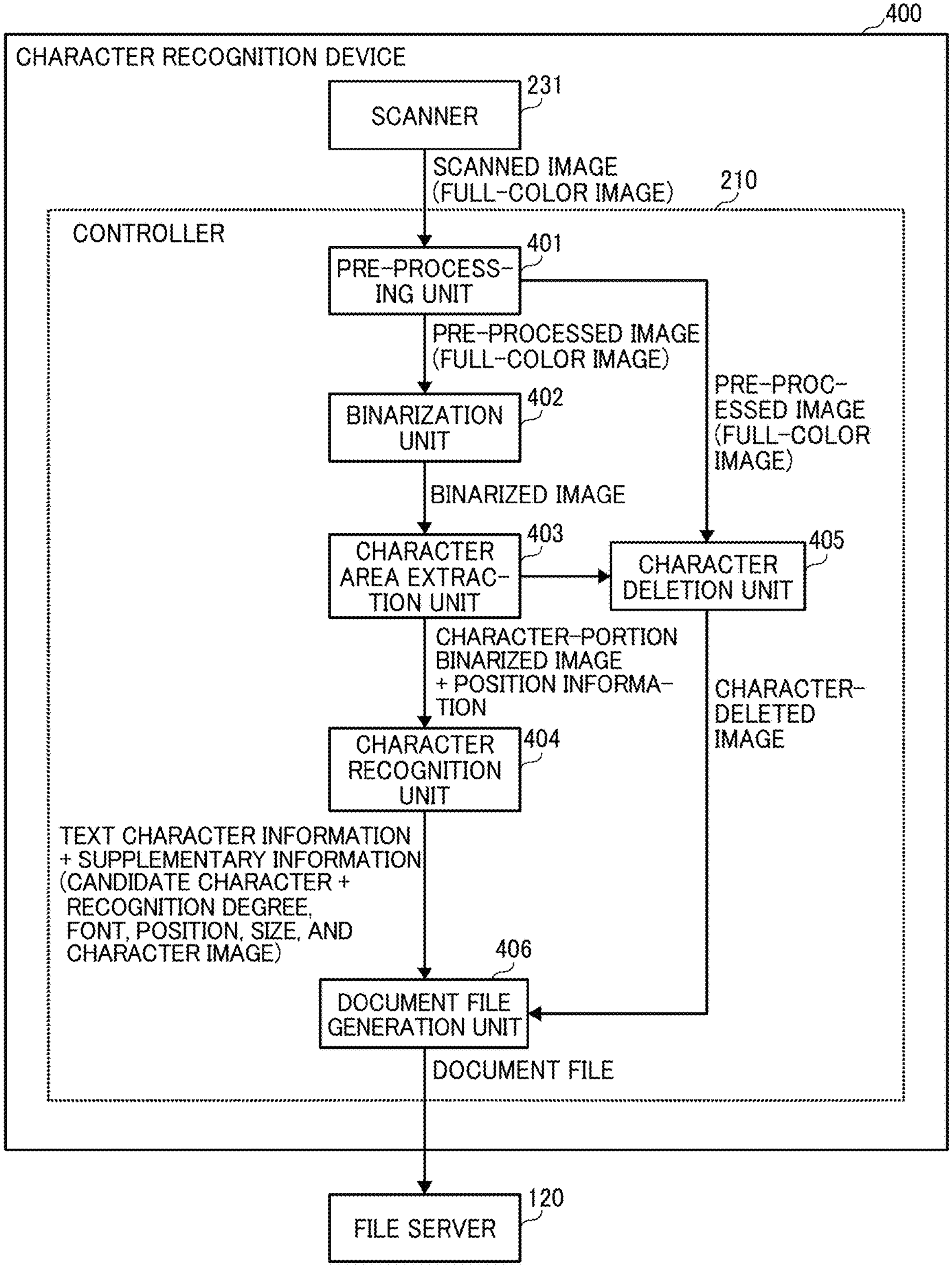
FIG. 4 is a diagram illustrating functional blocks of a character recognition device incorporated in the image forming apparatus according to an embodiment.

FIG. 4 is a block diagram illustrating a configuration example of a character recognition device according to the present embodiment. FIG. 5 is a diagram illustrating data generated by each functional unit illustrated in FIG. 4. A character recognition device 400 according to the present embodiment is an apparatus that converts characters, which are drawn on a scanned image obtained by reading a document, into digital data. The character recognition device 400 is incorporated in the image forming apparatus 110 and shares various hardware resources of the image forming apparatus 110. A controller 210 illustrated in FIG. 2 is a main part of the character recognition device 400.

The character recognition device 400 includes the above-described scanner 231 and also includes a pre-processing unit 401, a binarization unit 402, a character area extraction unit 403, a character recognition unit 404, a character deletion unit 405, and a document file generation unit 406, which are realized by the operation of the controller 210. The pre-processing unit 401, the binarization unit 402, the character area extraction unit 403, the character recognition unit 404, the character deletion unit 405, and the document file generation unit 406 are functional units that are realized by the CPU 301 in the controller 210 loading a program(s) stored in the HD 209 into the RAM 202*b* and executing an arithmetic operation.

Figure 5A:
FIGS. 5A to 5D are illustrations of an image obtained by scanning a document sheet and various intermediate data generated by the character recognition device according to an embodiment.

The scanner 231 receives an image reading instruction, reads a document sheet placed on a reading surface of the scanner 231, converts the read document sheet into a full-color image, and outputs the full-color image. A full-color image obtained by reading an original document in this manner is referred to as scanned image, and an example of the scanned image is illustrated in FIG. 5A.

The pre-processing unit 401 performs processing on the scanned image, which is a prerequisite for extracting characters. The pre-processing unit 401 performs, for example, inclination correction of a document, correction (shading correction or the like) for obtaining an image in which a difference in model of the scanner 231 is absorbed, and the like.

The image obtained by the pre-processing unit 401 is transferred to the binarization unit 402 and the character deletion unit 405 and is processed through two paths. In one path passing through the binarization unit 402, a process for extracting characters is performed. The other path passing through the character deletion unit 405 is a path for erasing characters from an image.

The binarization unit 402 acquires an image processed by the pre-processing unit 401 and binarizes the image to generate a binarized image. The binarized image generated by the binarization unit 402 is delivered to the character area extraction unit 403.

The character area extraction unit 403 extracts a rectangular area to be a character portion from the binarized image. The character area extraction unit 403 extracts and clips a rectangular area including a continuous character string (for example, a character string of one line in an image) and passes an image of the rectangular area (referred to as a "character-portion-binarized image") and position information of the character-portion-binarized image in the entire image to the character recognition unit 404. The character area extraction unit 403 also extracts a set of pixels constituting a character from the binary image and passes the set of pixels to the character deletion unit 405 as character-portion area information.

The character recognition unit 404 performs recognition processing of characters drawn in the character-portion-binarized image by using an existing OCR technique. The character recognition unit 404 selects a character having the highest degree of recognition as a first candidate and performs a process of selecting the first candidate for each character drawn in the character-portion-binarized image. Here, the recognition degree is an index value indicating the probability of recognition.

Figure 5B:
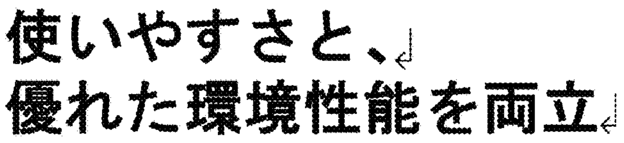

The character recognition unit 404 passes the character selected as the first candidate as the recognition result to the document file generation unit 406 as text character information. The character recognition unit 404 also generates supplementary information such as the position information acquired from the character area extraction unit 403, image data (character image) of the character to be recognized, and the size and font of the recognized character and passes the supplementary information to the document file generation unit 406. The character recognition unit 404 also generates a list in which candidate characters as a result of the character recognition processing are associated with their recognition degrees, and passes the list to the character recognition unit 404 as supplementary information. FIG. 5B illustrates text character information and supplementary information (position, size, and font) generated by the character recognition unit 404.

Figure 5C:
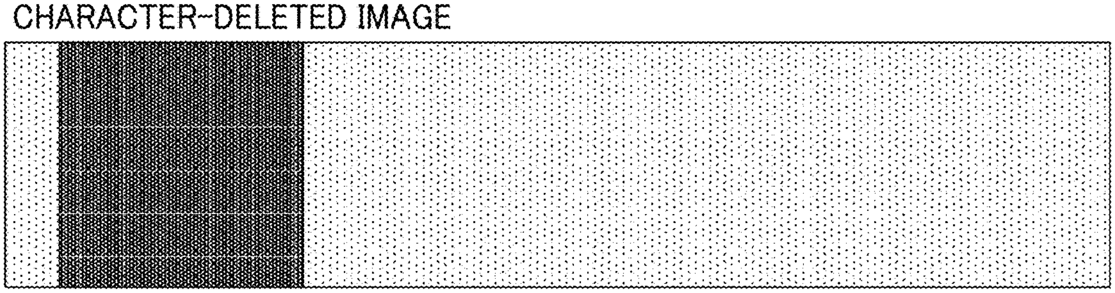

The character deletion unit 405 generates an image obtained by excluding characters from the pre-processed image using the pre-processed image passed from the pre-processing unit 401 and the character area information passed from the character area extraction unit 403. The generated image is referred to as a "character deleted image" and an example thereof is illustrated in FIG. 5C. The character deletion unit 405 generates a character deleted image by excluding a portion indicated by the character-portion area information from the pre-processed image, and calculates an interpolation value from surrounding pixel values and assigns the interpolation value to a value (pixel value) of each pixel of the deleted portion. The character deletion unit 405 passes the character deleted image generated in this manner to the document file generation unit 406. Note that it is also assumed that the character deleted image is divided for each image region and stored in a format in which an image and position information for each region are appended.

Figure 5D:
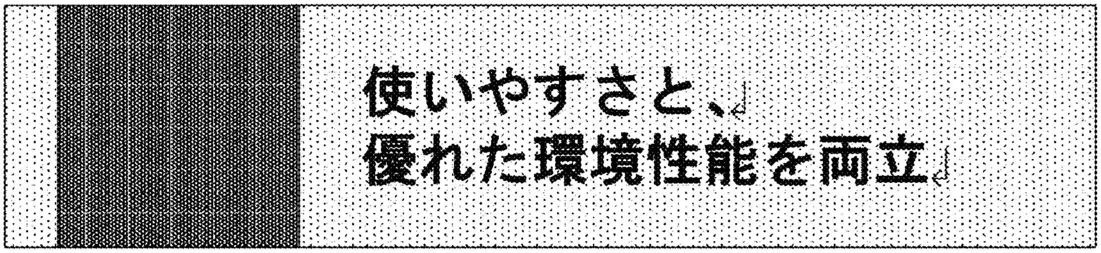

The document file generation unit 406 outputs a document file that can be browsed and edited by existing software for a word processor on the basis of the text character information, the supplementary information, and the character deleted image. As illustrated in FIG. 5D, the document file is displayed in a format in which text character information is superimposed on a character deleted image.

A document file generated according to the present embodiment is described below. In the present embodiment, a document file is created in the "Open XML (extensible markup language)" file format. "Open XML" is an xml-based format standardized as International Organization for Standardization (ISO)/International Electrotechnical Commission (IEC) 29500 and includes a plurality of files and folders. Examples of files constituting "Open XML" includes "document.xml" for describing the content of text, "fontTable.xml" for defining the font to be used, and "styles.xml" for defining the style of text. Each file is text data in the xml format, and therefore can be easily visually recognized as compared with binary data and can be easily edited. The document file generation unit 406 compresses the files constituting the "Open XML" into one file and adds an extension "docx" to the compressed file to generate a document file.

The document file generated in this manner is sent to a transmission destination designated by a user of, e.g., the file server 120. The user starts word processor software on the PC 140 or 150 and accesses the file server 120 to browse and edit the generated document file.

Here, an example has been described in which characters are deleted from an image to generate a character deleted image and text data is superimposed on the character deleted image. In some embodiments, for example, an object area may be extracted from an image (raster data) and vectorized in order to make an object (figure), such as a ruled line or an arrow, operable.

FIG. 5D illustrates an example of a document file in which the recognition degree of the first candidate is constantly high for all characters. On the other hand, FIGS. 6A and 6B illustrate a display example in a case where there is a character having a low degree of recognition of the first candidate and there are a plurality of candidate characters for the character.

Figure 6A:
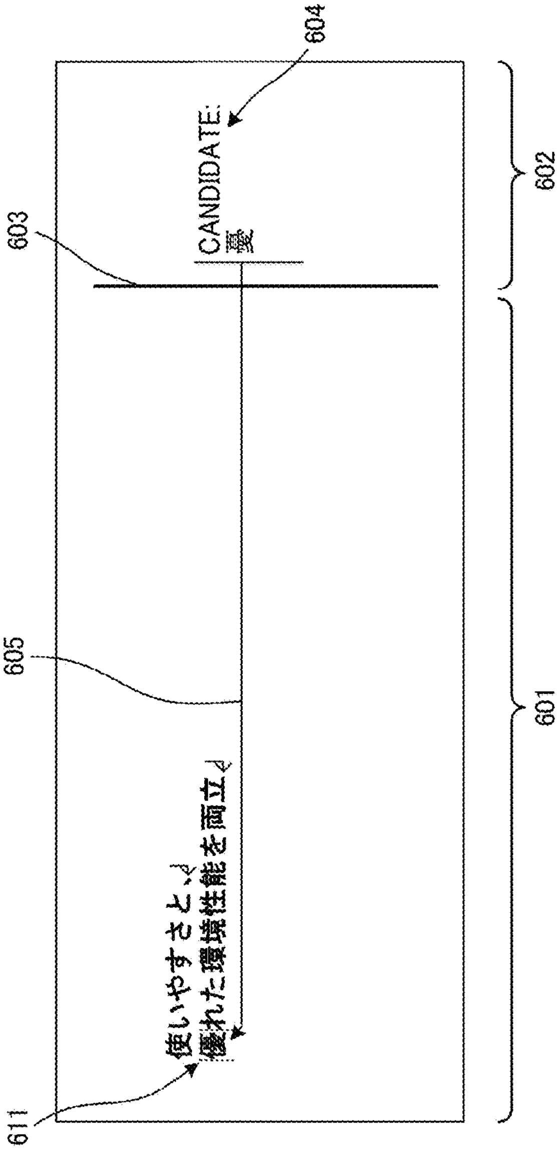
FIGS. 6A and 6B are illustrations of screen display examples when a document file created by the character recognition device according to an embodiment is displayed or printed.
Figure 6B:
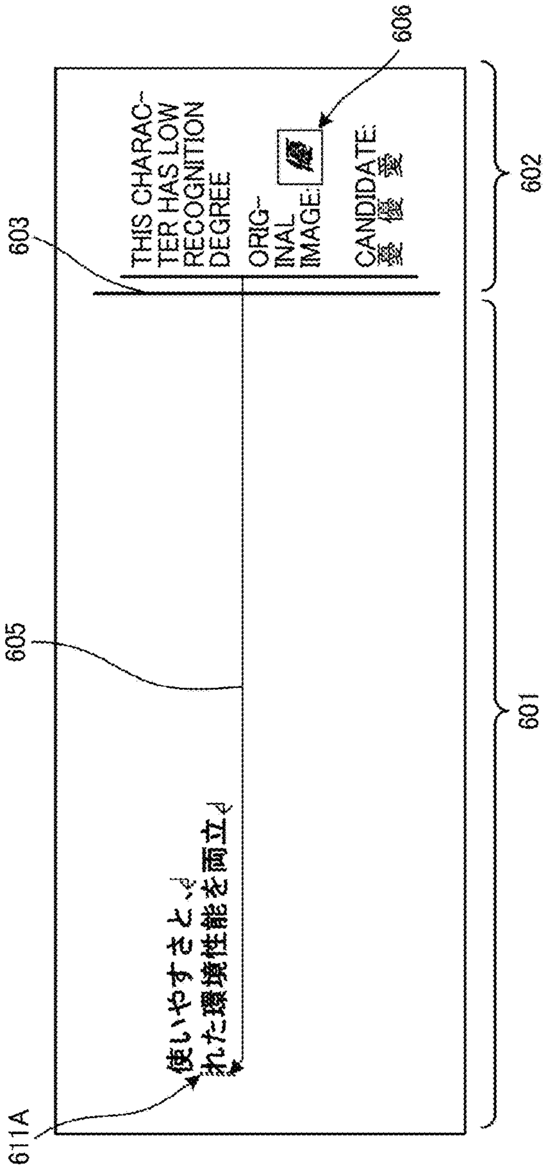

When the document file generated by the method according to the present embodiment is opened and brought into a browsing state, two regions are formed on the screen with a boundary line 603 as a boundary as illustrated in FIG. 6A. Here, one of the two regions is set as a content region 601 (first region), and the other is set as a comment region 602 (second region).

The content region 601 has a display configuration in which text character information is placed, and a first candidate character is placed in the content region 601. The comment region 602 has a display area smaller than a display area of the content region 601 and is a region in which candidate characters are displayed.

As indicated by a character 611 in FIG. 6A, when the recognition degree of the first candidate is lower than a first threshold (Th_A described later), another candidate character 604 is linked with the character 611 by a link line 605 and displayed in the comment region 602. In the example of FIG. 6A, since the degree of recognition of the kanji character "yuu" (meaning "excellence") is low, another candidate character 604 (kanji character "yuu" meaning "anxiety") is displayed in the comment region 602. As described above, in the present embodiment, the candidate characters are displayed separately from the display area of the recognized character, and the recognized character and other candidate characters are simultaneously displayed.

In the example of FIG. 6B, a case is illustrated where the recognition degree is further low and an appropriate character cannot be selected as the first candidate. In the present embodiment, when the recognition degree of the first candidate is lower than a second threshold value (Th_B described later) (second threshold value<first threshold value), an original image 606 of the character is inserted into the comment region 602 to prompt the user to discriminate the character. Cutting out and pasting the original image of the corresponding character in this manner can prompt the user to visually recognize the actual character image and recall the regular character.

The user can directly edit the character in the content region 601 while checking the contents described in the comment region 602, and thus can correct the document file to a regular document file. Further, when the document file is printed, the document file is printed in the state illustrated in each of FIGS. 6A and 6B. When the candidate characters become unnecessary, the user can perform an operation of deleting the candidate characters in the comment region 602 and thus can create the document file including only the content region 601.

Figure 7:
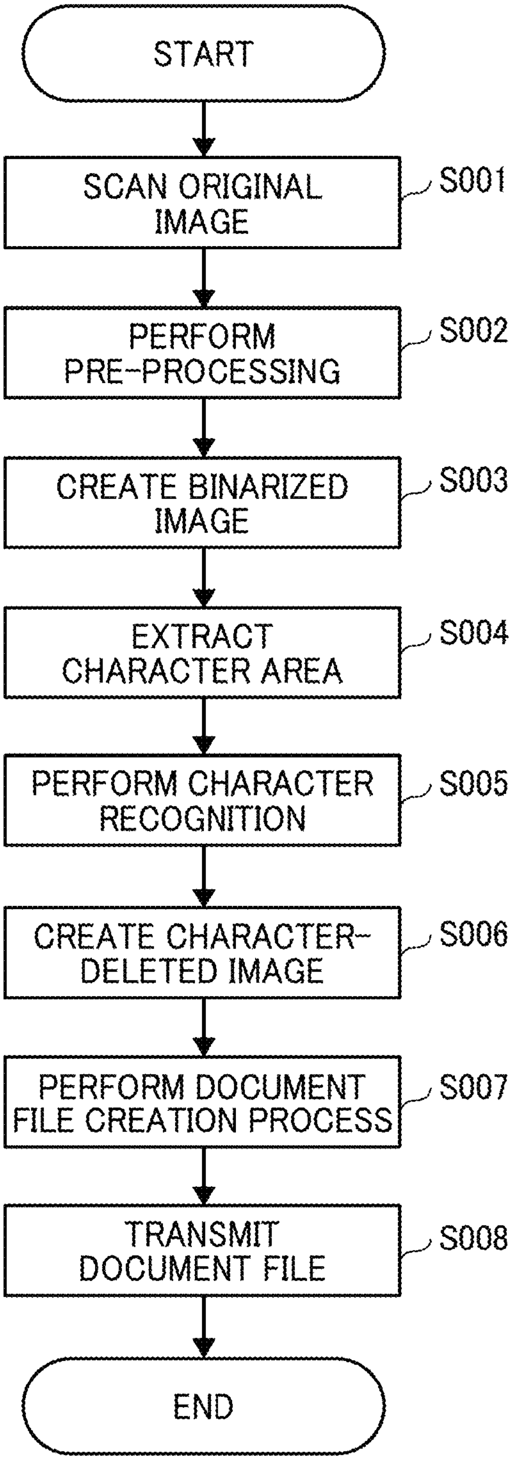
FIG. 7 is a flowchart of an example of an overall operation of the character recognition device according to the embodiment.

FIG. 7 is a flowchart illustrating an example of the overall operation of the character recognition device 400.

Receiving an execution instruction of character recognition from a user via the operation panel 240, the scanner 231 scans a document sheet placed on a reading surface of the scanner 231 and converts the scanned document sheet into electronic data. Thus, a scanned image is generated (S001).

The pre-processing unit 401 performs pre-processing such as shading correction on the scanned image (S002). The binarization unit 402 acquires the pre-processed image and generates a binarized image (S003). The character area extraction unit 403 acquires the binarized image and specifies a rectangular area in which characters are drawn in the binarized image. The character area extraction unit 403 cuts out the position of the specified rectangular area in the binarized image and the rectangular area to generate a character-portion-binarized image (S004).

In step S005, the character recognition unit 404 performs recognition processing of characters and fonts drawn in the character-portion-binarized image using existing OCR technology, and determines the character size. The character recognition unit 404 creates a list in which the recognized candidate characters are associated with the recognition degrees of the candidate characters in descending order of the recognition degrees, and assigns identification information (referred to as "ID") to the created list. In the data generated in this manner, the first candidate character is text character information, and a data structure including the list of candidate characters (including the first candidate), the ID, the font, the character size, a character image to be processed, and position information is supplementary information. The text character information and the supplementary information are generated for each of the recognized characters.

On the other hand, the character deletion unit 405 acquires the pre-processed image from the pre-processing unit 401, acquires the character-portion area information from the character area extraction unit 403, and creates a character deleted image (S005).

The document file generation unit 406 acquires text character information and supplementary information for each character from the character recognition unit 404 and acquires a character deleted image from the character deletion unit 405. The document file generation unit 406 generates a document file in a predetermined format (S007). A detailed operation of the document file generation unit 406 is described later with reference to FIGS. 8 and 9.

The document file generation unit 406 transmits the generated document file to a folder designated by a user in the file server 120 (S008). Thus, the user can access the document file and perform operations such as browsing and editing using prescribed word processor software.

Figure 8:
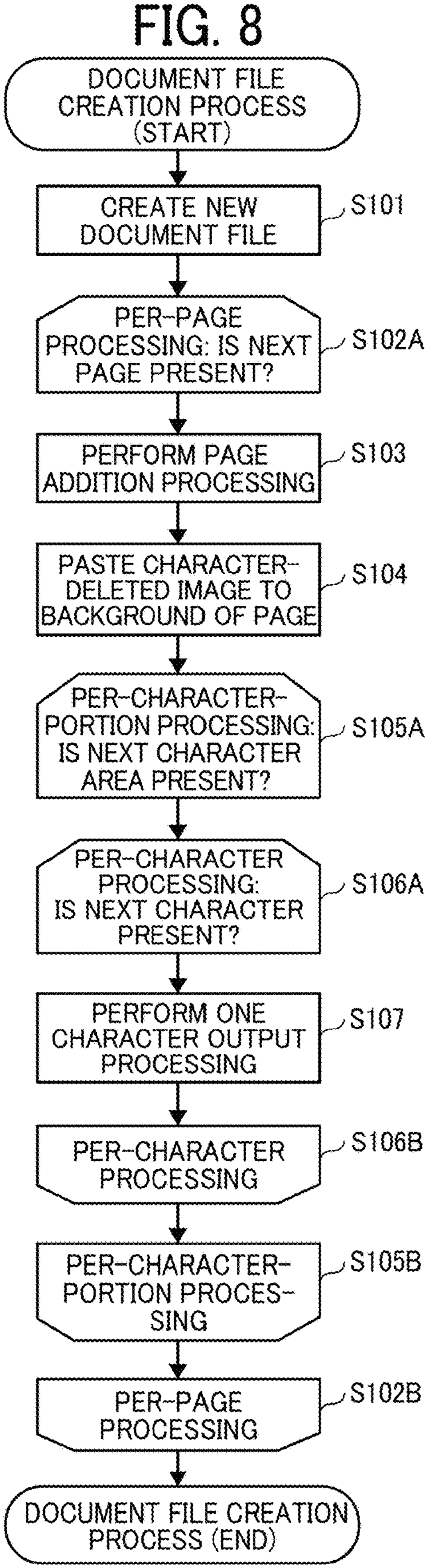
FIG. 8 is a flowchart of an operation example of document file creation processing according to an embodiment.

FIG. 8 is a flowchart illustrating a detailed operation of the document file creation processing in step S007. In the flowchart of FIG. 8, it is assumed that all target document sheets are read via the scanner 231, and character deleted images, text character information, and supplementary information are extracted in all pages.

In step S101, the document file generation unit 406 newly generates a document file. The document file generation unit 406 opens a file for storing a document file and creates and stores a common code used for the entire document file.

The document file generation unit 406 performs a "per-page processing loop" (S102A to S102B). The condition for exiting the loop is "whether a next page is present", and the document file generation unit 406 executes each step from S102A to S102B until the processing of all of one or more input pages is completed.

The document file generation unit 406 performs page addition processing (S103). In this case, a code necessary for generating a document file is generated and stored for each page.

The document file generation unit 406 pastes the character deleted image so that the character deleted image becomes the background image of the page (S104). In this case, the character deleted image is pasted on the image of page 1 generated in step S103.

The document file generation unit 406 performs a "per-character portion processing loop" (S105A to S105B). The processing in the loop is performed for each character area in one page. When no character area remains in the page, the document file generation unit 406 exits the loop. Here, the character area means a rectangular area including continuous character strings (for example, character strings of one line in an image) extracted by the character area extraction unit 403, and characters having the same position information are treated as belonging to the same character area. The document file generation unit 406 determines the presence or absence of the next character area using the position information in the supplementary information.

The document file generation unit 406 executes the "per-character processing loop" in the "per-character-area processing loop" (S106A to S106B). In the per-character processing loop, processing is performed for each character constituting the character string in the character area, and "one character output processing" (S107) is repeatedly performed until no more characters to be processed remains in the character area.

Figure 9:
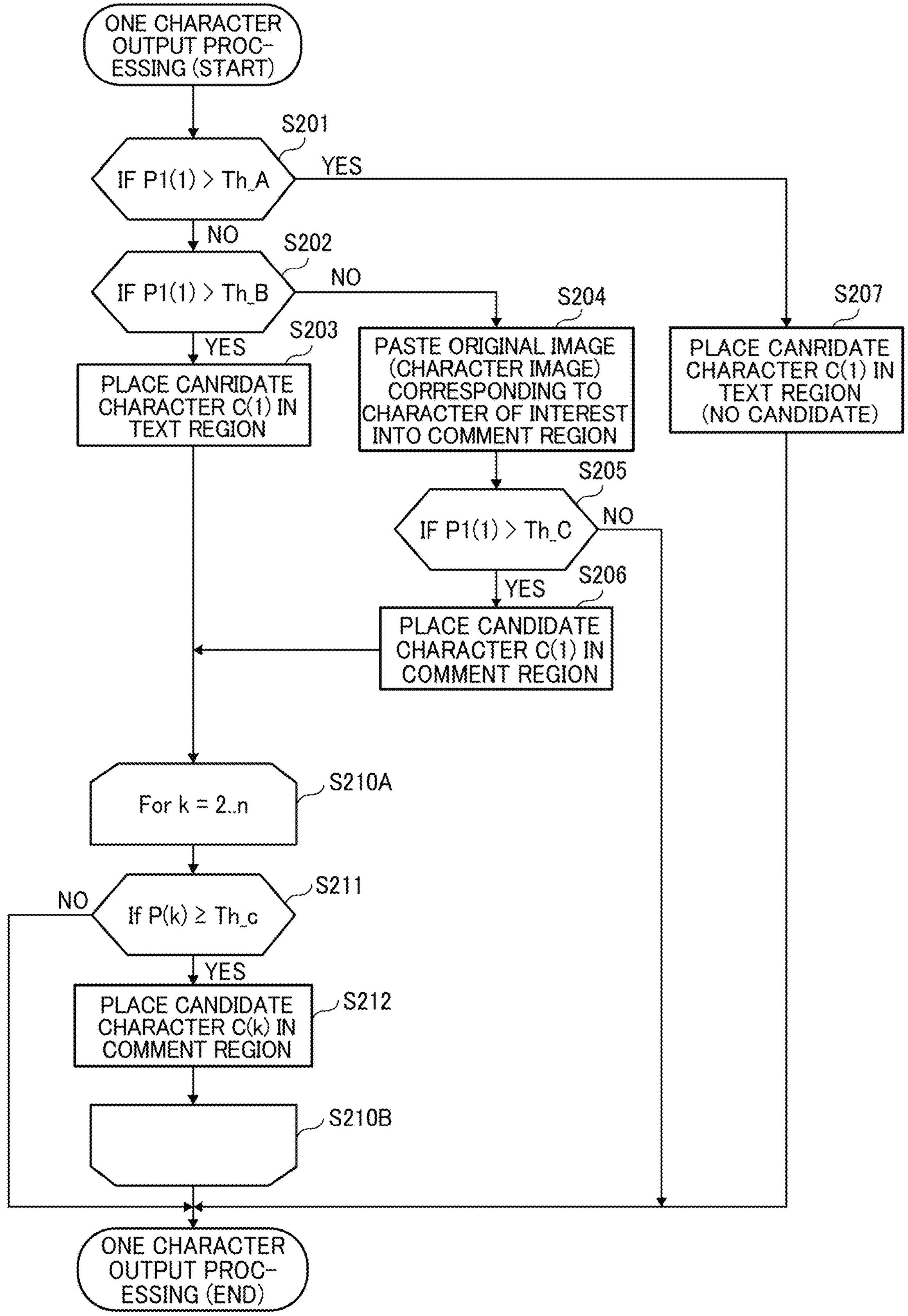
FIG. 9 is a flowchart of an operation example of one character output processing according to an embodiment.

FIG. 9 is a flowchart illustrating a detailed operation of the "one character output processing" in S107. In the flowchart of FIG. 9, the list generated by the character recognition unit 404 (the list in which the candidate characters and the degrees of recognition are associated with each other in the order of the degrees of recognition) is processed line by line from the top to the bottom of the list. In FIG. 9, n is the number of candidate characters (the number of records in the list). C(k) is the k-th candidate character (e.g., C(1) is the first candidate character). P(k) is the recognition degree of the k-th candidate character (P(1) is the recognition degree of the first candidate character). For P(k), the following relation is satisfied.

$$P(1) \geq P(2) \geq \ldots \geq P(n) \qquad \text{<Formula 1>}$$

$$\sum_{k=1}^{n} P(k) \leq 1$$

Th_x is a threshold value for comparison with the recognition degree of a character, and the arrangement configuration of each character changes depending on the comparison result. In the present embodiment, it is assumed that the relation of Th_A>Th_B>Th_C is satisfied.

Here, the outline of the flowchart of FIG. 9 is described. When the recognition degree P(1) of the first candidate character C(1) is larger than the threshold value Th_A, the character of interest is determined to be the first candidate character C(1), and the first candidate character C(1) is placed in the content region 601. When P(1) is within the range of from the threshold value Th_A to the threshold value Th_B, the first candidate character C(1) is placed in the content region 601 and the other candidates (candidate characters having a recognition degree equal to or higher than the threshold value Th_C) are placed in the comment region 602. If P(1) is less than Th_B, the original image, that is, character image of the character of interest is displayed in the comment region 602.

The detailed operation of the flowchart of FIG. 9 is further described.

The document file generation unit 406 acquires the first one line of the list, that is, the first candidate character C(1) having the highest recognition degree and the recognition degree P(1) of the first candidate character C(1) from the list and compares P(1) with the threshold value Th_A (S201). If P(1) is larger than Th_A (YES in S201), the document file generation unit 406 places C(1) in the content region 601 (S207). Here, C(1) is incorporated into "document.xml" of "Open XML". In the case where the process passes step S207, the recognition result is treated as a valid recognition result in which no erroneous recognition has occurred, and the process ends without placing other candidate characters in the comment region 602.

On the other hand, when P(1) is equal to or smaller than Th_A (NO in S201), the document file generation unit 406 compares P(1) with the threshold value Th_B (S202). If P(1) is larger than Th_B (YES in S202), the document file generation unit 406 places C(1) in the content region 601 (S203), and the processing proceeds to step S210A.

When P(1) is equal to or smaller than Th_B (NO in S202), the document file generation unit 406 pastes the original image corresponding to the character of interest into the comment region 602 (S204). The document file generation unit 406 adds identification information to the original image and stores the original image with the identification information in the "media" folder of the "Open XML". The document file generation unit 406 resisters the identification information of the original image together with a character string such as "This is a character with a low recognition degree" in "comments.xml" of "Open XML".

Next, the document file generation unit 406 compares P(1) with the threshold value Th_C (S205). When P(1) is equal to or smaller than Th_C (NO in S205), the document file generation unit 406 determines that no character corresponding to a candidate character is found, and ends the process of FIG. 9. On the other hand, if P(1) is larger than Th_C (NO in S205), C(1) is placed as text data in the comment region 602 as a candidate character (S206), and the process proceeds to S210A. In step S206, the document file generation unit 406 registers the character (text data) of C(1) and the ID in "comments.xml", and describes the same ID in the corresponding position of "document.xml" to performs association. Although the ID in the supplementary information is used here, a newly issued ID may be used.

After C(1) is placed in the content region 601 in S203 or after C(1) is placed in the comment region 602 in S205, the document file generation unit 406 executes loop processing of S210A to S210B. The loop processing is performed while sequentially changing the variable k from 2 to n.

The document file generation unit 406 compares P(k) with the threshold value Th_C (S211). If P(k) is equal to or greater than Th_C (YES in S211), the document file generation unit 406 treats C(k) as a candidate and places C(k) in the comment region 602 (S212). Here, the character (text data) of C(k) and the ID is registered in "comments.xml" and the ID is assigned to the corresponding position of "document.xml" for association. On the other hand, if P(k) is less than Th_C (NO in S211), the process of FIG. 9 exits the loop processing and ends.

Executing such processing allows creation of a document file having the display format described with reference to FIG. 6. Note that the character 611 in FIG. 6A is a display example in a case where the loop processing of S210A to S210B is performed via S203, and is a display example in a case where the relationships with the threshold values are as follows.

$$Th\_B<P(1)\leq Th\_A$$

$$P(2)\geq Th\_C$$

$$P(3)<Th\_C$$

In FIG. 6A, C(1) is "yuu" that is a kanji character meaning "excellence" and C(2) is "yuu" that is another kanji character meaning anxiety.

The blank space 611A in FIG. 6B is an example of a case where the recognition degree of the first candidate is lower than Th_C (P(1)≤Th_B) and higher than Th_C (Th_C<P1), and is a display example of a case where the loop processing of S210A to S210B is performed via S204 and S205. When the degree of recognition of the first candidate is low, the first candidate is not placed in the content region 601 and is left blank as illustrated in FIG. 6B in the present embodiment. In some embodiments, the first candidate may be always placed in the content region 601.

In the above-described embodiment, the method is described in which processing is performed for every one character and candidate characters are placed in the comment region for every one character. In some embodiments, processing may be collectively performed for each character string in unit of e.g., word or clause to place candidate characters for the character string in the comment region.

In the present embodiment, other candidate characters can be displayed or a scanned image can be attached using the "comment function" in accordance with the recognition accuracy of character recognition by OCR. Thus, the user can be provided with a clue to guess the original character.

In the correction work in the case of erroneous recognition, when there is a valid character among candidates placed in the comment region, the user can perform the "copy and paste" operation to easily replace the characters.

The display format illustrated in FIGS. 6A and 6B and the like is merely an example. Even when the same office application is used, the display format may be changed by switching the display mode such as the browsing mode or the outline mode, or the appearance may be changed depending on the version difference. In the present embodiment, data in which the recognized character (first candidate) and the other candidate characters are associated with each other may be generated and displayed in association with each other. In other words, in the present embodiment, it is sufficient to generate data in a format in which the recognized character (first candidate) and the other candidate characters can be displayed in association with each other. Although "Open XML" is exemplified as such a data format in the present embodiment, another data format may be used.

In the present exemplary embodiment, the character recognition device is incorporated in the image forming apparatus. However, in some embodiments, the functions of the character recognition device described above may be incorporated in the PC 140, a smartphone, or the like. Alternatively, a camera-equipped mobile terminal such as a smartphone may take a close-up image of a document sheet and use the close-up image as a scanned image. Note that the expression "to scan and read a document" may be used to include close-up of a document by a camera function. In the present embodiment, the "scanned image" is described as an image itself read by the scanner. An image obtained by performing image processing (pre-processing, binarization processing, or the like) on the read image may be referred to as a "scanned image".

The above-described document file generation unit generates a document file in a format in which the first candidate is displayed in the content region and the other candidate characters are displayed in the comment region. In addition, a document file may be created in a format in which other candidate characters are displayed in a typeface different from a typeface of the first candidate. Here, the typeface means a font transparency, a font type, a font size, a font color, whether a bold face, an italic face, an underline, or a marker is given, a character color and a background color are reversed, and the like. In addition, the typefaces of the candidate characters may be varied in accordance with the difference in recognition degree. That is, the document file generation unit according to the present embodiment generates a document file in a format in which the first candidate having the highest recognition degree and the other candidate characters are displayed at the same time in different forms and in a format that can be edited by the user. When the first candidate and the other candidates have different typefaces, the other candidates may be placed in the content region.

As described above, according to the aspects of the embodiments described above, the user can be given a clue to guess the original character even when there is an erroneous recognition in the character recognition by the OCR.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A character recognition device configured to convert characters on a scanned image obtained by reading a document into digital data, the character recognition device comprising:

control circuitry configured to:

perform character recognition processing on the scanned image;

generate data in which candidate characters or character strings of a character or character string recognized by the character recognition processing are associated with recognition degrees representing probabilities of the candidate characters or character strings;

display a first candidate having a highest recognition degree among the candidate characters or character strings; and generate a document file in a format in which another candidate, other than the first candidate, of the candidate characters or character strings is displayed simultaneously with the first candidate, in association with the first candidate, and in a form different from a form of the first candidate.

2. The character recognition device according to claim 1, wherein the control circuitry is configured to generate the document file in a format in which the first candidate is displayed in a first region and said another candidate is displayed in a second region having a smaller display area than the first region.

3. The character recognition device according to claim 2, wherein the control circuitry is configured to generate the document file in a format in which the scanned image in which the character or character string recognized by the character recognition processing is drawn is displayed in the second region.

4. The character recognition device according to claim 3, wherein the control circuitry is configured to generate the document file in the format in which the scanned image in which the character or character string recognized by the character recognition processing is drawn is displayed in the second region in response to the highest recognition degree being below a threshold.

5. The character recognition device according to claim 1, wherein the control circuitry is configured to generate the document file in an editable format.

6. The character recognition device according to claim 1, wherein the control circuitry is configured to generate a character deleted image by removing the candidate characters or the character strings from the digital data.

7. The character recognition device according to claim 6, wherein the control circuitry is configured to superimpose text characters corresponding with the candidate characters or the character strings on the deleted image.

8. The character recognition device according to claim 1, wherein the control circuitry is configured to generate the document file in Open XML file format.

9. The character recognition device according to claim 1, wherein the control circuitry is configured to generate the document file such that the first candidate is linked with the another candidate via a link line.

10. A method for generating a document file in a character recognition device configured to convert characters on a scanned image obtained by reading a document into digital data, the method comprising:

performing character recognition processing on the scanned image;

generating data in which candidate characters or character strings of a character or character string recognized by the character recognition processing are associated with recognition degrees representing probabilities of the candidate characters or character strings;

displaying a first candidate having a highest recognition degree among the candidate characters or character strings; and generating the document file in a format in which another candidate, other than the first candidate, of the candidate characters or character strings is displayed simultaneously with the first candidate, in association with the first candidate, and in a form different from a form of the first candidate.

11. The method according to claim 10, wherein the generating includes generating the document file in a format in which the first candidate is displayed in a first region and said another candidate is displayed in a second region having a smaller display area than the first region.

12. The method according to claim 11, wherein the generating includes generating the document file in a format in which the scanned image in which the character or character string recognized by the character recognition processing is drawn is displayed in the second region.

13. The method according to claim 10, wherein the generating includes generating the document file in an editable format.

14. A non-transitory computer-readable storage medium storing program code for causing a computer to execute a method for generating a document file in a character recognition device, the method comprising:

performing character recognition processing on a scanned image;

generating data in which candidate characters or character strings of a character or character string recognized by the character recognition processing are associated with recognition degrees representing probabilities of the candidate characters or character strings;

displaying a first candidate having a highest recognition degree among the candidate characters or character strings; and generating document the file in a format in which another candidate, other than the first candidate, of the candidate characters or character strings is displayed simultaneously with the first candidate, in association with the first candidate, and in a form different from a form of the first candidate.

15. The storage medium according to claim 14, wherein the generating includes generating the document file in a format in which the first candidate is displayed in a first region and said another candidate is displayed in a second region having a smaller display area than the first region.

16. The storage medium according to claim 15, wherein the generating includes generating the document file in a format in which the scanned image in which the character or character string recognized by the character recognition processing is drawn is displayed in the second region.

17. The storage medium according to claim 14, wherein the generating includes generating the document file in an editable format.

* * * * *